United States Patent
Mallinson

(10) Patent No.: US 9,098,663 B2
(45) Date of Patent: Aug. 4, 2015

(54) SYSTEM AND METHOD FOR SERIES AND PARALLEL COMBINATIONS OF ELECTRICAL ELEMENTS

(71) Applicant: ESS Technology, Inc., Fremont, CA (US)

(72) Inventor: A. Martin Mallinson, Kelowna (CA)

(73) Assignee: ESS Technology, Inc., Fremont, CA (US)

( * ) Notice: Subject to any disclaimer, the term of this patent is extended or adjusted under 35 U.S.C. 154(b) by 31 days.

(21) Appl. No.: 14/446,780

(22) Filed: Jul. 30, 2014

(65) Prior Publication Data

US 2015/0040085 A1 Feb. 5, 2015

Related U.S. Application Data

(60) Provisional application No. 61/859,888, filed on Jul. 30, 2013.

(51) Int. Cl.
*G06F 17/50* (2006.01)
(52) U.S. Cl.
CPC ........ *G06F 17/5045* (2013.01); *G06F 2217/02* (2013.01); *G06F 2217/06* (2013.01)
(58) Field of Classification Search
USPC .................................................. 716/100–107
See application file for complete search history.

(56) References Cited

U.S. PATENT DOCUMENTS

| | | | |
|---|---|---|---|
| 6,263,476 B1 * | 7/2001 | Browen et al. | 716/112 |
| 2004/0025130 A1 | 2/2004 | Jaska et al. | |
| 2004/0031002 A1 | 2/2004 | Du et al. | |
| 2009/0322575 A1 | 12/2009 | Tukel | |
| 2010/0246607 A1 * | 9/2010 | Kawajiri et al. | 370/498 |
| 2012/0246607 A1 | 9/2012 | Mallinson | |

* cited by examiner

*Primary Examiner* — Binh Tat
(74) *Attorney, Agent, or Firm* — Gard & Kaslow LLP

(57) ABSTRACT

A method and system for generating and matching complex series and/or parallel combinations of nominally identical initial elements to achieve an arbitrary compound value is disclosed. A recursive algorithm successively adds one or more similar nominal two-terminal elements to generate a series and/or parallel compound combination of nominal elements, the compound combination having a desired impedance. The compound value, and thus the ratio between two compound values, can be determined to almost any desired degree of accuracy, with potential errors greatly reduced from those typical in the construction of individual elements of different values. Since the initial elements are nominally identical, the compound value, and the ratio between values, depends primarily upon the connections of the initial elements, rather than their geometry, and thus remain virtually constant regardless of variations in the manufacturing process.

3 Claims, 6 Drawing Sheets

402

SYSTEM AND METHOD FOR SERIES AND PARALLEL COMBINATIONS OF ELECTRICAL ELEMENTS

This application claims priority from Provisional Application No. 61/859,888, filed Jul. 30, 2013, which is incorporated by reference herein in its entirety.

FIELD OF THE INVENTION

The present invention relates generally to the design of electronic circuits. More specifically, the invention relates to methods for implementing component values in semiconductor circuits.

BACKGROUND OF THE INVENTION

Semiconductor circuits formed on semiconductor chips, or wafers, include a number of types of circuit elements, including, for example, resistors, capacitors, inductors, transistors, etc. These elements must be created on the semiconductor chip in a way that the value or performance of the element meets the requirements of the circuit in which they are included.

Any semiconductor material has certain characteristics, and some of these characteristics are such that an element constructed on the semiconductor will have a certain value that depends in whole or part upon the area occupied by the element. A number of elements, including resistors, capacitors and inductors, are thus typically created as geometric shapes of a size that, given the characteristics of the semiconductor, will result in a particular value specified by a desired circuit design.

In particular, certain designs require the use of elements that are arbitrarily different in value but have a particular ratio. For example, to achieve a gain of 3.33, an operation amplifier may be configured in a so-called virtual ground configuration with a 1000 ohm ($\Omega$) resistor and a 3,330$\Omega$ resistor (or 3.33 kilohms (k$\Omega$); 1000$\Omega$=1 k$\Omega$). One known way of achieving this is to use a resistor of a given width and length for the input 1 k$\Omega$ resistor (the sheet resistance of the semiconductor material will determine the area of the resistor), and another resistor of the same width but 3.33 times the length of the 1 k$\Omega$ resistor for the 3.33 k$\Omega$ feedback resistor.

However, one of skill in the art will appreciate the problems inherent in such construction. For example, the physical dimensions of an element are susceptible to errors or variations in the manufacturing process, which may not be able to reliably or repeatedly make the precise dimensions determined to yield the desired value for the resistor. Even small errors in the dimensions of the desired 1 k$\Omega$ and 3.33 k$\Omega$ resistors in the above example may result in significant differences in their actual resistances and, more importantly, in the ratio between them. While such dimensional errors may seem small, they may be enough to degrade the accuracy or performance of the circuit on the semiconductor chip.

Still further, in building elements on a semiconductor chip, it is necessary to make connections to the material. For example, to build a poly-silicon resistor on a chip there must be contact holes, and sometimes different doping levels at each end, for the metal traces to make good contact. The contact holes and associated features introduce an "end effect," which is typically an unwanted additional resistance in series with the intended resistance, and is thus to be added to the value of the resistance as designed. This additional resistance generally depends largely upon how accurately the contact holes are cut in the chip material; it also creates a difference or error from the desired value, creating a resistance higher than intended, and makes it hard to match dissimilar values precisely since the unwanted end effect resistance may not be precisely known.

Again, suppose that it is desired to build two resistors with a ratio of 1 to 3.33, with one resistor being 1 k$\Omega$ and the other being 3.33 k$\Omega$. Even if the resistors are built to the precise size to yield these values, if the "end effect" adds, for example, 100$\Omega$ to each value, then the ratio between what are effectively a 1.1 k$\Omega$ resistor and a 3.43 k$\Omega$ resistor becomes 3.118 rather than the desired 3.33, an error of almost 7 percent. Again, this may significantly alter the desired performance of the circuit.

These issues make it difficult to implement elements on semiconductor chips having precise values, and more specifically to implement multiple elements with precise ratios between their values.

One possible solution is provided in U.S. Pat. No. 8,453, 097 (hereafter "the '097 patent"), commonly assigned to the assignee of the present application. However, in some embodiments the method of the '097 patent contemplates calculating and storing all the values of all possible combinations of a selected number n of nominally identical impedance elements, which may be undesirable. Accordingly, a different method which does not require such calculations or storage may be desirable.

SUMMARY OF THE INVENTION

A method and system is disclosed for generating complex series and/or parallel combinations of nominally identical initial elements to achieve arbitrary non-trivial compound values. Combinations built as disclosed herein maintain the ratio between a compound value and the value of the initial element, and thus between two compound values as well, nearly constant to a high degree of accuracy regardless of variations in the manufacturing process.

One embodiment discloses a method of designing a semiconductor circuit component having an arbitrary impedance value and constructed as a combination of repeated nominally identical impedance elements, wherein each impedance element is a resistor having a resistive impedance or each impedance element is an inductor having an inductive impedance, comprising: receiving as an input at a computing device the arbitrary impedance value for the component and setting the arbitrary impedance value as a target value; receiving as an input at the computing device a nominal impedance value of each of the repeated nominally identical elements to be used in the component; defining in the computing device the initial value of the component as zero, and the combination of identical elements as a null set; determining by the computing device whether the target value is greater or less than the nominal impedance value; if the target value is greater than the nominal impedance value: determining by the computing device the maximum number of impedance elements that when placed in series have a combined impedance less than the target value; adding by the computing device, in series, the determined number of impedance elements to the combination of identical elements, connected to a most recently added identical element if any, and calculating an updated value of the component; updating by the computing device the target value by subtracting the total impedance of the impedance elements added in series from the current target value; if the target value is less than the nominal impedance value: determining by the computing device the maximum number of impedance elements that when placed in parallel have a combined impedance greater than the target value; adding by the computing device, in parallel, the determined number of impedance elements to the combination of identical elements, connected to a most recently added identical element if any, and calculating an updated value of the component; updating by the computing device the target value by determining a impedance value that when placed in parallel with the impedance elements will result in the current target value; determining by the computing device whether the updated value of the component is within a specified tolerance of the arbitrary impedance, and: if the value of the component is not within the specified tolerance, repeating the step of determining whether the target value is greater or less than the nominal resistance value and subsequent steps; if the value of the component is within the specified tolerance, exiting the process and returning the combination of identical elements as an output.

Another embodiment discloses a non-transitory computer readable storage medium having embodied thereon instructions for causing a computing device to execute a method of designing a semiconductor circuit component having an arbitrary impedance value and constructed as a combination of repeated identical impedance elements, wherein each impedance element is a resistor having a resistive impedance or each impedance element is an inductor having an inductive impedance, the method comprising: receiving as an input at a computing device the arbitrary impedance value for the component and setting the arbitrary impedance value as a target value; receiving as an input at the computing device a nominal impedance value of each of the repeated nominally identical elements to be used in the component; defining in the computing device the initial value of the component as zero, and the combination of identical elements as a null set; determining by the computing device whether the target value is greater or less than the nominal impedance value; if the target value is greater than the nominal impedance value: determining by the computing device the maximum number of impedance elements that when placed in series have a combined impedance less than the target value; adding by the computing device, in series, the determined number of impedance elements to the combination of identical elements, connected to a most recently added identical element if any, and calculating an updated value of the component; updating by the computing device the target value by subtracting the total impedance of the impedance elements added in series from the current target value; if the target value is less than the nominal impedance value: determining by the computing device the maximum number of impedance elements that when placed in parallel have a combined impedance greater than the target value; adding by the computing device, in parallel, the determined number of impedance elements to the combination of identical elements, connected to a most recently added identical element if any, and calculating an updated value of the component; updating by the computing device the target value by determining a impedance value that when placed in parallel with the impedance elements will result in the current target value; determining by the computing device whether the updated value of the component is within a specified tolerance of the arbitrary impedance, and: if the value of the component is not within the specified tolerance, repeating the step of determining whether the target value is greater or less than the nominal resistance value and subsequent steps; if the value of the component is within the specified tolerance, exiting the process and returning the combination of identical elements as an output.

Still another embodiment discloses a method of designing a semiconductor circuit component having an arbitrary impedance value and constructed as a combination of repeated nominally identical impedance elements, wherein each impedance element is a capacitor having a capacitive impedance, comprising: receiving as an input at a computing device the arbitrary impedance value for the component and setting the arbitrary impedance value as a target value; receiving as an input at the computing device a nominal impedance value of each of the repeated nominally identical elements to be used in the component; defining in the computing device the initial value of the component as zero, and the combination of identical elements as a null set; determining by the computing device whether the target value is greater or less than the nominal impedance value; if the target value is greater than the nominal impedance value: determining by the computing device the maximum number of impedance elements that when placed in parallel have a combined impedance less than the target value; adding by the computing device the determined number of impedance elements, in parallel, to the combination of identical elements, connected to a most recently added identical element if any, and calculating an updated value of the component; updating by the computing device the target value by subtracting the total impedance of the impedance elements added in parallel from the current target value; if the target value is less than the nominal impedance value: determining by the computing device the maximum number of impedance elements that when placed in series have a combined impedance greater than the target value; adding by the computing device the determined number of impedance elements, in series, to the combination of identical elements, connected to a most recently added identical element if any, and calculating an updated value of the component; updating by the computing device the target value by determining a impedance value that when placed in series with the impedance elements will result in the current target value; determining by the computing device whether the updated value of the component is within a specified tolerance of the arbitrary impedance, and: if the value of the component is not within the specified tolerance, repeating the step of determining whether the target value is greater or less than the nominal resistance value and subsequent steps; if the value of the component is within the specified tolerance, exiting the process and returning the combination of identical elements as an output.

DETAILED DESCRIPTION OF THE INVENTION

Figure 1:
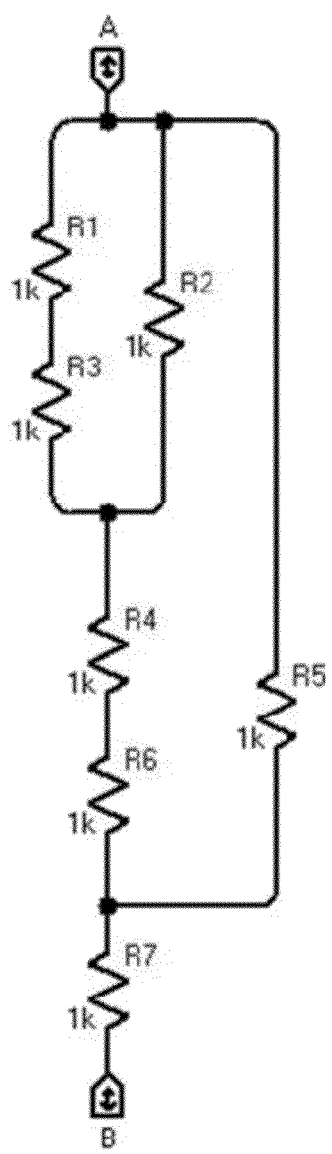
FIG. 1 shows one possible combination of seven resistors each having an identical nominal value.

The present application describes a method and system for generating complex series and/or parallel combinations of nominally identical initial elements to achieve an arbitrary compound value by means of a recursive algorithm. By using such nominally identical initial elements, the ratio between the compound value and the value of the initial element (and thus between two compound values as well) remains nearly constant regardless of variations in the manufacturing process, and thus does not rely on the ability to make either the component or the nominal element to a precise value. Using the techniques described herein, a chip designer can implement a methodology of element matching that does not depend on precise geometric differences of the elements, which can vary in manufacturing as above, but rather depends only on their connectivity.

In the described method, a recursive algorithm successively adds one or more nominally identical two-terminal elements to generate a series and/or parallel compound combination of nominal elements, the compound combination having a desired impedance. For example, if the initial element is a resistor of 1 kΩ, the algorithm configures series and parallel combinations of multiple instances of the 1 kΩ resistor to build a compound element having a desired resistance value. Where a ratio between two values is desired, the value of the initial element may be selected so that one value is provided by a single element.

The described method realizes various benefits of using multiple nominally identical elements as described herein; such benefits also apply to the methods of the '097 patent. However, in contrast to some embodiments of the method of the '097 patent, which contemplate calculating and storing all the values of all possible combinations of a selected number n of nominal elements, the method described herein requires only one short set of calculations which result in a compound element having the desired impedance. This method may be faster, and require less storage, than calculating all possible combinations of a number of elements.

It is well known that the connection of multiple elements having impedance in series and/or parallel connections results in an equivalent impedance that may differ from the impedance of any of the elements; for example, it is apparent to those of skill in the art that three 1 kΩ resistors make an effective resistance of 3 kΩ when placed in series, or make 333.3Ω when placed in parallel. However, other combinations are not apparent; a designer is unlikely to be able to quickly determine how to connect a number of resistors of 1 kΩ each in a configuration that results in a resistance of say 4.567 kΩ without spending some significant amount of time to design such a configuration. The described method works for all cases, both the trivial ones where the elements are all in series or all parallel and thus may be expressed as simple integer ratios (1:3 or 3:1 as above, etc.), as well as for any other non-trivial cases, and can determine combinations that result in arbitrary values.

The method described herein does not require the calculation and storage of the values of all possible combinations of a number of identical elements as in some embodiments of the '097 patent. However, as is the case with the method of the '097 patent, the matching of combinations of elements having different values built in this way is much improved over the current art, and does not suffer from such systematic errors from dimensional accuracy as the prior art method of varying the physical dimensions of elements to achieve different values.

In addition, since a combination of nominal elements will typically occupy more area on the chip than a single element, any variations in the manufacturing process are more likely to even out over the greater area, reducing the impact of such manufacturing variations on the value of the combination as compared to variations in the value of an individual element. Thus, even if the dimensions are not precise, each element, and thus each combination of elements, will generally suffer the same systematic variation in the process, and the ratio of the value of a combination of elements to the basic element, or between two combinations of elements, will be preserved.

Similarly, in the methodology described here, the "end effects" described above that add resistance will generally contribute significantly less error than in the prior art. This is because such effects will generally be randomly spread across a greater number of the nominally identical elements, and are thus less likely to cause significant variations than in the case of two individual elements. Thus, while the total resistance of an individual element or a combination may change as any end effect resistance changes, the ratio, which as above is often more important than the absolute value, will not change by much, if at all.

Another benefit of using identical elements is that an automatic place and route software tool can more easily place and connect the complex series and/or parallel elements on the chip. This is because each element, such as a resistor or other component, is the same nominally identical element used over and over again; all combinations use the same element of the same shape, differing only in connectivity, and this fits well into the place and route tool methodology. The potentially tedious process of designing the layout of a chip is thus made less complex and more convenient by the use of series and/or parallel connections of nominally identical elements as described herein.

One of skill in the art will readily understand that two electrical elements, for example, resistors, inductors, or capacitors, may be connected in series or in parallel. It is well known that the effective value of such a series or parallel combination of two elements of the same type will differ from the value of either element. For example, the equation describing the effective resistance $R_s$ of a series connection of resistances $R_1$ and $R_2$ is:

$$R_s = R_1 + R_2$$

while the effective resistance $R_p$ of the parallel connection of $R_1$ and $R_2$ is:

$$R_p = \frac{1}{\frac{1}{R_1} + \frac{1}{R_2}}$$

Thus, if two resistors of the same value are connected in series, the resistances add and the series combination yields twice the resistance of each element. If the two resistors are connected in parallel, the effective resistance will be half of the resistance of each element. The values of inductors in series and parallel are determined in the same way as resistors, but capacitances are the opposite. For ease of reference, resistors are generally referred to herein, it being understood that the described method and apparatus may also operate on inductors and capacitors as well.

As was mentioned above, one way of creating a ratio of, for example, 1 to 1.7273 between two resistance values is to build two resistors having that ratio between their area, for example, one resistor 1 micron wide and 10 microns long, and the other 1 micron wide and 17.273 microns long. Also as above, errors in precision in manufacturing may change the value of each resistor and thus the ratio between them.

Another way of creating a ratio of 1 to 1.7273 between two resistance values will be seen from FIG. 1. A first resistor of 1 kΩ (not shown alone) may be made, and then, rather than changing the shape to make the second resistor as is common in the prior art, a combination of seven 1 kΩ resistors that are nominally identical to the first resistor may be made as shown in FIG. 1 (or as nearly identical as possible given the manufacturing process).

The equations above can be used to calculate the value of the resistor combination of FIG. 1. Again, if each resistor is 1 kΩ, from FIG. 1 the effective value of resistors $R_1$, $R_2$, and $R_3$ is 666.67Ω. Adding resistors $R_4$ and $R_6$ in series with resistors $R_1$, $R_2$, and $R_3$ results in 1 kΩ+1 kΩ+666.67 Ω=2.667 kΩ. Placing this amount of resistance in parallel with the 1 kΩ of $R_5$ results in an effective resistance of 727.3Ω. Finally, adding the 1 kΩ of $R_7$ to the effective resistance of 727.3Ω of resistors $R_1$ to $R_6$ gives an effective resistance of 1,727.3Ω, or 1.7273 kΩ, for the combination of FIG. 1.

As above, the ratio between a 1 kΩ resistor (again, not shown) and the 1.7273 kΩ resistor combination of FIG. 1 will remain at 1.7273 regardless of any erosion or expansion of the area of a 1 kΩ resistor in manufacturing, since all of the resistor shapes are identical and will experience similar erosion or expansion. The ratio is derived from the connection of the resistors in the combination of FIG. 1, rather than from any attempt to adjust the lengths or widths of the individual resistors.

Similarly, since the "end effect" will be the same for each resistor, the resistance added to each resistor will be the same, and thus the ratio will again be preserved, as in the case above where the area of each resistor changes in manufacturing. For this reason, using combinations of identical resistors to make the desired ratios is relatively immune from both geometric errors and contact resistance at the resistor ends, and is a better way to match resistors on a semiconductor chip.

It can be confirmed from the formulas above that if the nominal value of the repeated resistor changes, then the value of each combination of such resistors changes by the same percentage, so that the ratio remains the same. For example, if each resistor in FIG. 1 is changed by 10 percent, from 1 kΩ to 900Ω, the value of the combination changes from 1.7273 kΩ to 1.5546 kΩ, also a change of 10 percent. Similarly, if each resistor is changed by 50 percent, to 500Ω, the value of the combination changes by 50 percent, to 863.65Ω. Similar calculations will show that the same is true of any other combination of nominally identical resistors.

As above, a manufacturing process may have variations which make building an individual element having precise dimensions and a specific value difficult; however, in general it is expected that any such variations will themselves remain at least approximately constant across the small size of a particular circuit on a semiconductor chip. Thus, any nominally identical elements on the chip will have identical, or nearly identical, variations from the intended shape and value, and the ratio between all such elements, or their combinations, will remain constant to a much greater degree than if an attempt is made to build each element to a desired value as in the prior art.

In order to understand and use the complex series and/or parallel configurations of repeated elements contemplated herein, it is helpful to have some way of representing such structures mathematically as well as pictorially. The algorithm described herein uses the same algebraic notation used in the '097 patent, one which has been developed to allow such configurations to be expressed mathematically, as well as allowing a software language to operate on such expressions.

The algorithm uses prefix notation with two defined operators. One operator is "s" representing series connection of elements, and the other operator is "p" representing parallel connection of elements. Each operator accepts any arbitrary number of operands.

As will be understood by those of skill in the art, considered as data, an "s" or "p" expression is a list structure, the first item of the list being the operator and successive items being the operands. Operands are evaluated from left to right, and any list operands are recursively evaluated. Thus, as one example, the expression (s2(p3))

is a list of three items, "s," "2," and "(p 3)." The first item of the list is "s," the operator. The second item "2" is the first argument to "s," and the third item, "(p 3)" is the second argument to "s," and is itself a list.

The arguments to the "s" and "p" operators are operands that are either other expressions of "s" and "p" or non-zero cardinal numbers representing the number of repeated elements to which the operator is to be applied. For example, the expression "(s 3)" represents the "s" or series operator applied to a single argument, the cardinal number 3, representing three repeated elements. Evaluation of "(s 3)" by the evaluator defined above results in the number 3, and thus in three elements being placed in series.

The expression "(s 2 (p 3))" represents the "s" series operator applied to two arguments. The first argument is the cardinal number 2, representing two repeated elements to be placed in series. The second argument is "(p 3)," representing the "p" parallel operator applied to the cardinal number 3, representing three repeated elements to be placed in parallel, and this parallel configuration to then be placed in series with the other two elements.

This recursive analysis may be repeated as often as necessary. Thus, to construct an expression representative of the series or parallel combination of any other two expressions is equivalent to repeatedly constructing a list of three items, the first item being "s" or "p," the second item being the first of the two expressions, and the third item being the other expression.

For example, if two structures A=(s 4) and B=(s 2 (p 3)) are to be constructed in parallel, the list "(p A B)" is created, and may be written as:

(p(s4)(s2(p3)))

Similarly, the series combination is "(s A B)" or:

(s(s4)(s2(p3)))

It may also be seen that simplification is sometimes possible. For example, in the last series combination, since A contains four elements in series and is itself in series with B, which contains two more elements in series, the expression may be simplified to:

(s6(p3))

As a further example of this notation, in the combination of FIG. 1 resistors R1, R2 and R3 are represented as (p 1 (s 2)), since two resistors $R_1$ and $R_2$ are in series, and that combination is then in parallel with another resistor $R_3$. Adding resistors R4 and R6 in series with these results in:

(s2(p1(s2)))

Putting this combination in parallel with resistor $R_5$ yields the expression:

(p1(s2(p1(s2))))

Finally, adding resistor $R_7$ to this combination results in the overall expression for FIG. 1 of:

(s1(p1(s2(p1(s2)))))

As stated above, some embodiments of the '097 patent contemplate determining all of the possible serial and parallel connections that may be made between a number of elements. For any number of elements, it is relatively straightforward to do so, although it will be appreciated that it becomes more time consuming to do so as the number of elements increases. For 1 element, there is of course only one configuration (as in FIG. 3 below). Two elements results in two combinations, placing the elements either in series or in parallel with each other. Three elements may be all in series or all in parallel, or two elements may be in series with each other and then in parallel with the third.

For greater numbers, one way of determining all possible combinations of n elements is to first determine all of the combinations of elements for a number less than n and then putting these combinations in all possible combinations with the remaining elements. Thus, for n=4, all combinations of three elements can be determined, and then the fourth element put in series or parallel with each of those combinations. Similarly, all combinations of two elements can be put in series or parallel with all combinations of two elements. By starting with n=1 and proceeding in this way, all combinations may be determined for any value of n.

It will be appreciated that the number of combinations grows exponentially, so that in the case of n=16, there are approximately 600,000 possible combinations. Thus, in order to effectively determine and use combinations of more than a very few elements, in one embodiment the '097 patent describes a way to implement the construction and evaluation of such combinations of elements in software and have a processor perform the calculations for all possible combinations of a given value of n. To get a desired ratio, any two values from the resulting dataset of the values of all calculations may be selected.

While the values of all combinations for n=16 might be calculated in a matter of minutes or less, in some applications it may be desirable to have say n=24; for example, more resistors allow for both greater and smaller compound values, as well as greater precision between a compound value and the nominal value, or between two or more compound values. However, due to the exponential growth of possible combinations for higher numbers, the resulting calculations in the case of n=24 might take months or longer. If a design must be completed in a short time, such a delay might make a desired design impractical to execute. Further, one may not wish to store the hundreds of millions of values of all possible combinations when n=24.

For this reason, it is desirable to be able to design a single compound element without having to calculate many or all of the possible combinations of some number of elements as is done in some embodiments of the '097 patent. One embodiment of the present application allows such a design to be determined by use of a recursive algorithm that produces a series and/or parallel combination of nominal elements which results in an arbitrary desired value of the compound element.

Figure 2:
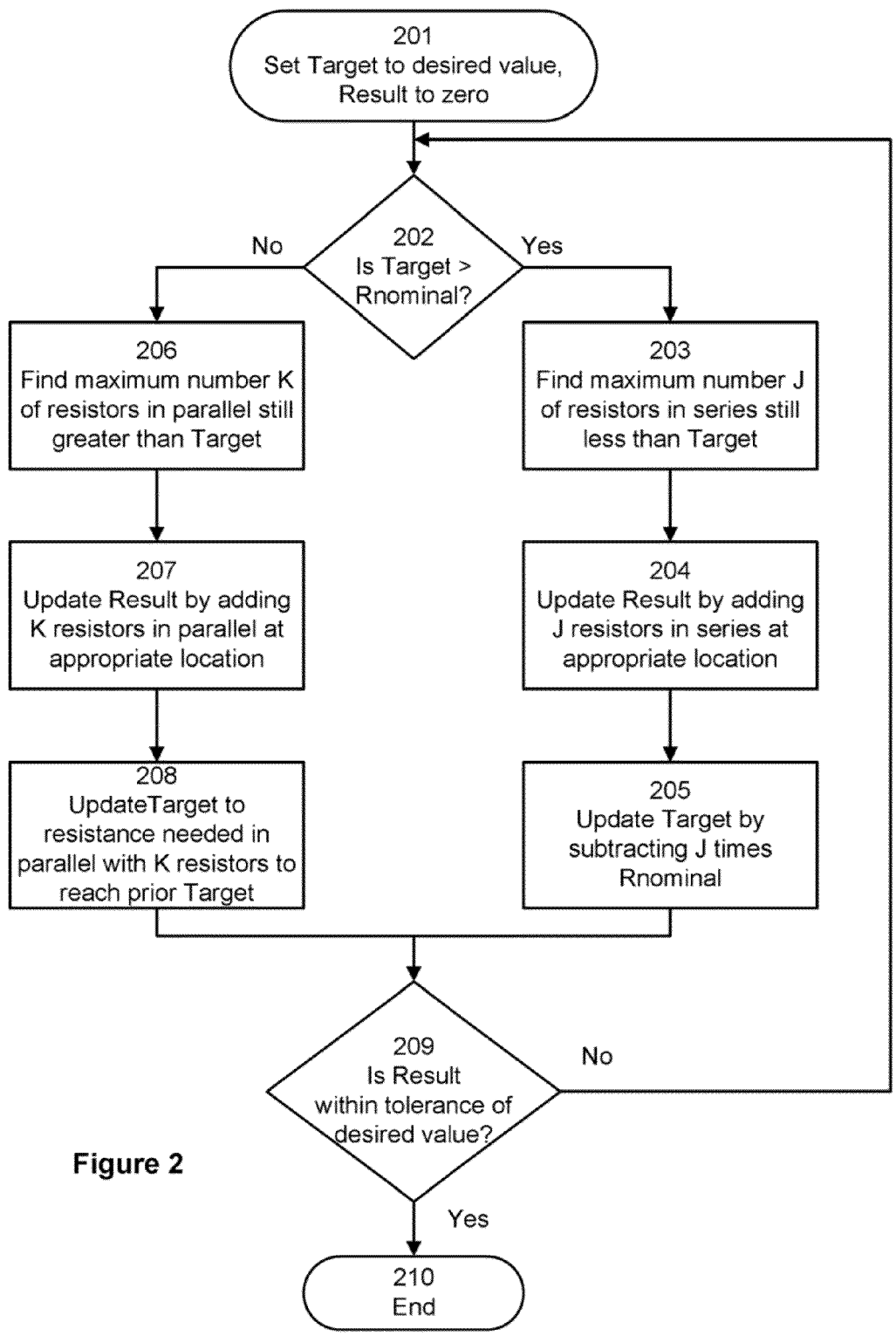
FIG. 2 is a flowchart illustrating one possible embodiment of a method using a recursive algorithm as described herein embodied in software.

FIG. 2 is a flowchart of such a recursive algorithm according to one embodiment. It is expected that in practice, the algorithm will be performed in large part, if not in whole, by a processor or computer. The algorithm assumes that a single resistor has a known nominal value $R_{NOMINAL}$. If desired, an optional step may be inserted at the start of the process to allow for receipt by the processor of an input value for $R_{NOMINAL}$, for example by selection of the nominal value by a user, or possibly by another program. In the discussion below, for ease of explanation $R_{NOMINAL}$ is assumed to be 1Ω, although any other value is possible. As above, while resistors are used in this example, the same algorithm may be used for inductors, which in series and parallel follow the same mathematics as resistors; the same principles may be used for capacitors with the steps regarding series and parallel elements reversed as the mathematics for capacitors is the reverse of that for resistors and inductors.

As the algorithm proceeds, in each "loop" the algorithm adds one or more resistors, either in series or parallel, to the compound element being designed. An updated value, here called Result, shows the resistance of the compound element at each step in the process as the compound element is progressively generated by the algorithm. After each recursive loop, the resistance of Result is compared to the desired final value, until Result is within some desired tolerance of the desired value, at which point the algorithm stops and outputs a series-parallel combination of nominal resistive elements which has the last updated value of Result, i.e., the desired value within the specified tolerance. It is contemplated that the notation described above may be easily used to express the circuit as it is determined by the algorithm; this will be seen below.

At step 201, the variable Target is defined and given an initial value; the initial value of Target is the desired value of the compound resistive element. This initial value is received by the processor, and may be determined by a user, or, in some embodiments, may be an automated input received from, for example, another program or algorithm which specifies a needed resistance for a particular circuit. The value of Target is updated as the algorithm proceeds, but the original value, i.e., the desired final resistance of the compound element, is kept for further use as described below.

Additionally at step 201, the variable Result is initially defined as zero, and a null set of elements.

At step 202, Target is compared to $R_{NOMINAL}$. If Target is greater than $R_{NOMINAL}$, then one or more nominal resistors should be added in series to get a value greater than $R_{NOMINAL}$ and closer to Target. On the other hand, if Target is less than $R_{NOMINAL}$, then adding resistors in series will not help, and one or more resistors should be added in parallel to get a value less than $R_{NOMINAL}$.

Where it is determined at step 202 that Target is greater than $R_{NOMINAL}$ and resistors are to be added in series, the process proceeds to step 203. At step 203, the algorithm determines the maximum number of resistors J which, when placed in series, result in a resistance less than Target. Thus, if Target at this point is, for example, 7.3Ω, where $R_{NOMINAL}$=1Ω step 206 will result in finding that J=7.

At step 204, the number of resistors J determined in step 203 is added to the existing value of Result, and the value of Result is updated accordingly. In the example where J=7, 7 of the nominal value resistors are added in series to the compound element being created, and the numerical value of Result is modified accordingly. If steps 203 and 204 are occurring for the first time, then Result will be these seven resistors in series, and the numerical value of Result will be 7; if this is not the first time steps 203 and 204 occur, these seven resistors will be added to the compound element in the appropriate place, as will be seen in an example below.

At step 205, the value of Target is modified to reflect the addition of the J resistors, by making the new value of Target equal to the prior value of Target minus the nominal value of the added resistors, i.e., J times the nominal resistance of a single resistor. Since in this case $R_{NOMINAL}$=1Ω, the new value of Target is equal to the prior value of Target minus 7; in this example, if the prior value of Target is 7.3Ω, then the new value of Target is 7.3 minus 7, or 0.3 Ω.

Returning to step 202, if the processor instead determines that Target is less than $R_{NOMINAL}$ and thus resistors are to be added in parallel, the process proceeds to step 206. At step 206, the algorithm determines the maximum number of resistors K which, when placed in parallel, will result in a resistance still greater than Target. Thus, if Target at this point is, for example, 0.3Ω, again with $R_{NOMINAL}$=1Ω step 209 will result in finding that K=3, since three resistors in parallel will have a resistance of 0.3333 Ω.

At step 207, the number of resistors K determined in step 206 is added to the existing value of Result at the appropriate location, and the value of Result is again updated accordingly.

At step 208, a new value of Target is set, now to the resistance value which, if placed in parallel with the K resistors, would result in the prior value of Target. It will be appreciated that in the example given, to obtain a value of 0.3Ω with an element having an effective resistance of 0.3333Ω, another resistance of 3Ω must be placed in parallel with the 0.3333Ω resistance. Thus, the new Target will be 3Ω.

After either step 205 or step 208, i.e., after resistors have been added in either series or parallel and Result and Target updated accordingly, the algorithm goes to step 209 where Result is compared to the desired final resistance value to determine if the new value of Result is within the desired tolerance of the desired compound resistance value. If Result is close enough to the desired resistance value, the algorithm ends at termination step 210. If Result is not close enough to the desired value, then the algorithm returns to step 202 and continues with the updated value of Target.

The algorithm continues with these steps until the built-up value Result of the compound element that has been created by this process is within the desired tolerance. It has been found in practice that the algorithm will always create a compound element within any specified tolerance, i.e., that the value of Result will converge on the desired total resistance.

Appendix A contains a sample listing of one software implementation of this method, written in Lisp (there may be some variations of order from the flowchart of FIG. 2 but the principles are the same). A subroutine Fix is the main recursive function; after evaluating Result to determine whether it is sufficiently accurate, it determines whether additional elements should be added, and then determines the next value of Target.

FIGS. 3 through 9 illustrate a specific example showing the compound element after each step in the process of the described algorithm in the design of such an element having a specific desired value. For the purpose of this example it is again assumed that the nominal element has a value of 1Ω, and that the desired resulting compound element should have a value of 1.23456Ω, with a tolerance of 1 part per million (ppm). Again, as above, the recursive algorithm will work with any value of the nominal element and any desired compound value.

Figure 3:
FIGS. 3 through 9 illustrate various points in the design of a resistive element comprised of a number of resistors each having an identical nominal value according to a recursive algorithm in one embodiment.
Figure 4:
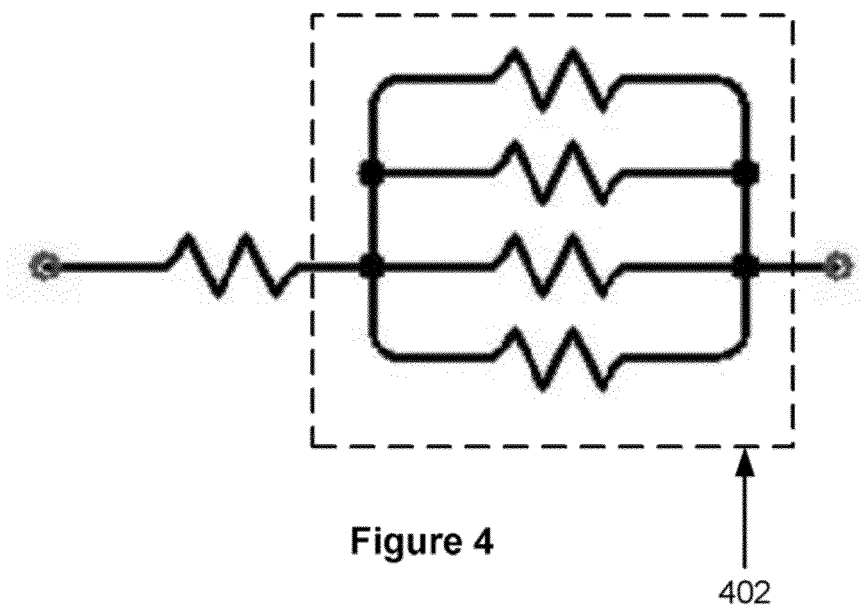
Figure 5:
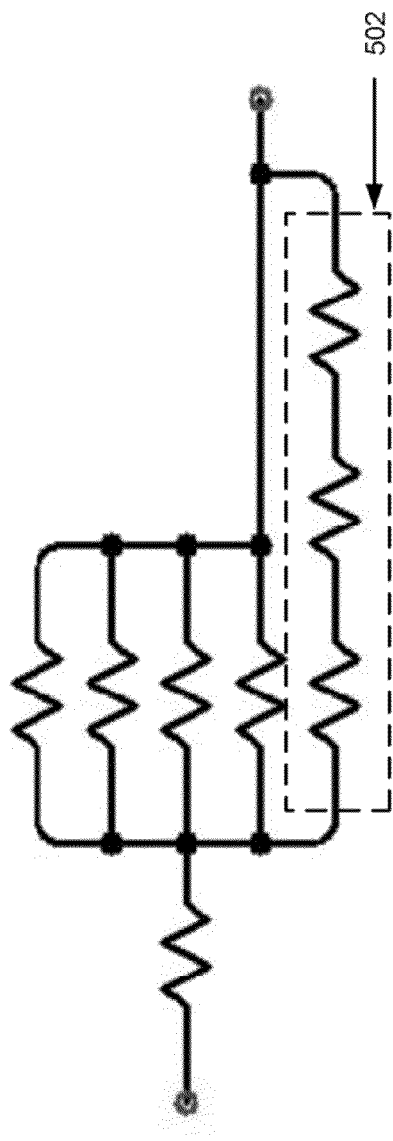
Figure 6:
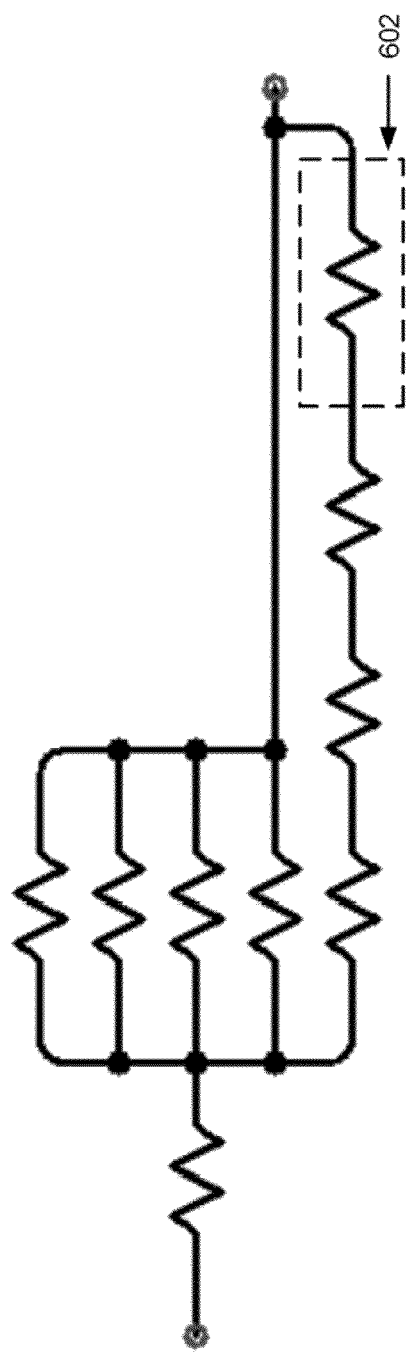
Figure 7:
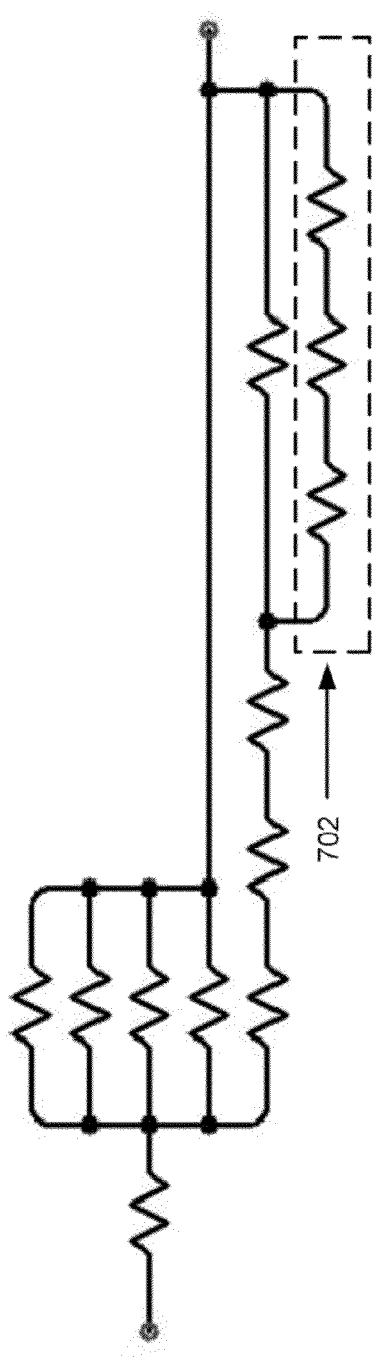
Figure 8:
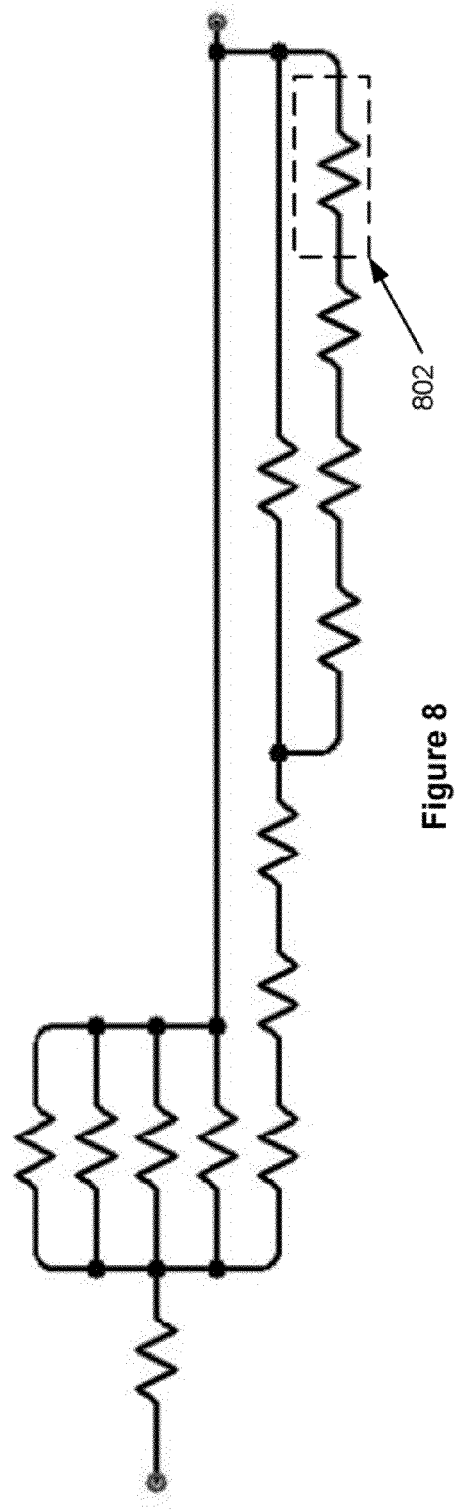

Target is thus initially set to 1.23456Ω (step 201), and $R_{NOMINAL}=1$. Since Result is not yet within tolerance (step 203), the algorithm will proceed to step 205, where Target is determined to be greater than $R_{NOMINAL}$. At step 206, the algorithm determines that the maximum number of nominal resistors that results in a resistance less than Target is 1, so 1 resistor is added (step 207) as shown in FIG. 3. Result is updated to a value of 1 and may be written in the notation above as (s 1). At step 208, Target is updated by the subroutine Fix to be 1.23456Ω minus 1Ω for the resistor that was added, so Target is now 0.23456 Ω.

The algorithm returns to step 203 where Result is not yet within tolerance, and at step 205 Target is now determined to be less than $R_{NOMINAL}$. At step 209, it is determined that the largest number of resistors that can be placed in parallel and still be greater than 0.23456Ω is 4, which result in a resistance of 0.25Ω. At step 210, Result is augmented by adding 4 resistors in parallel with each other, and that group of 4 resistors is placed in series with the original resistor as shown in box 402 of FIG. 4. Result is now 1.25Ω and may be written as (s 1 (p 4)). At step 211, the subroutine Fix determines that a resistance of 3.797927Ω should be placed in parallel with the 4 resistors just added to make the resistance of the added resistors be the value of Target of 0.23456Ω, so Target is updated to 3.797927Ω, and the algorithm returns to step 203.

Result is still not within tolerance, and at step 205, the updated value of Target of 3.797927Ω is again greater than $R_{NOMINAL}$. At step 206, it is determined that the maximum number of resistors in series that is less than Target is 3, so at step 207 3 resistors in series are added, with that series being parallel to the 4 resistors previously added, as shown by box 502 in FIG. 5. Result is again augmented, and is now represented by (s 1 (p 4 (s 3))). At step 208, subroutine Fix updates Target by subtracting 3Ω from 3.797927Ω, making Target now 0.797927Ω, and the algorithm returns to step 203.

Result is still not within tolerance, and at step 205, Target of 0.797927Ω is greater than $R_{NOMINAL}$. Now, however, at step 209 the maximum number of resistors in parallel that result in a value that is greater than Target is 1. Accordingly, Result is augmented at step 210 by adding a single resistor in series with the 3 that were added in the previous loop, as shown by box 602 in FIG. 6. Result is now represented by the expression (s 1 (p 4 (s 3 (p 1)))). At step 211 subroutine Fix determines that a resistance of 3.94872Ω should be placed in parallel with the last resistor added in FIG. 6 in order to obtain the value of Target of 0.797927Ω, so Target is updated to 3.94872Ω and the algorithm returns to step 203.

Result is still not within tolerance, and at step 205, Target of 3.94872Ω is again greater than $R_{NOMINAL}$. At step 206, it is determined that the maximum number of resistors in series that is less than Target is again 3, so at step 207 3 resistors in series are added, with that series being parallel to the 1 resistor previously added, as shown by box 702 in FIG. 7. Result is again augmented, and is now represented by (s 1 (p 4 (s 3 (p 1 (s 3))))). At step 208, subroutine Fix updates Target by subtracting 3Ω from 3.94872Ω, making Target now 0.94872Ω, and the algorithm returns to step 203.

Again, result is still not within tolerance, so at step 205, Target of 0.94872Ω is again greater than $R_{NOMINAL}$, and at step 209 the maximum number of resistors in parallel that is greater than Target is again 1. Accordingly, Result is augmented at step 210 by adding a single resistor in series with the 3 that were added in the previous loop, as shown by box 802 in FIG. 8. Result is now represented by the expression (s 1 (p 4 (s 3 (p 1 (s 3 (p 1)))))). At step 211 subroutine Fix determines that a resistance of 18.5Ω should be placed in parallel with the last resistor added in FIG. 8 in order to obtain the Target of 0.94872Ω, so Target is updated to 18.5Ω and the algorithm returns to step 203.

Once again Result is still not within tolerance, and at step 205, Target of 18.5Ω is again greater than $R_{NOMINAL}$. At step 206, it is determined that the maximum number of resistors in series that is less than Target is 18, so at step 207 18 resistors in series are added, with that series being parallel to the 1 resistor previously added, as shown by box 902 in FIG. 9. Result is again augmented, and is now represented by (s 1 (p 4 (s 3 (p 1 (s 3 (p 1 (s 18))))))). At step 208, subroutine Fix updates Target by subtracting 18Ω from 18.5Ω, making Target now 0.5Ω, and the algorithm returns to step 203.

Figure 9:
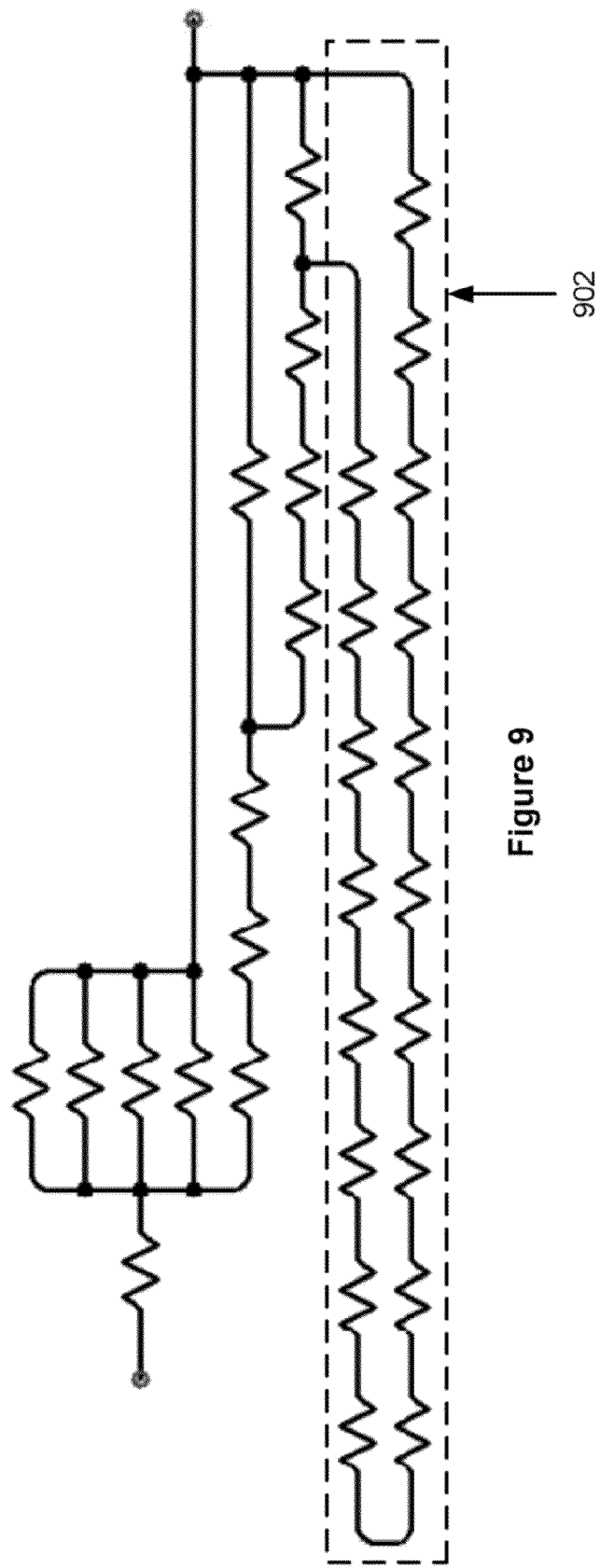

One of skill in the art will appreciate that it would be trivial to add two more resistors in parallel to arrive at the new Target of 0.5, and place those two resistors in series with the 18 just added in FIG. 9. However, this turns out to be unnecessary, since now at step 203 it is determined that the overall resistance of the compound element in FIG. 9 is 1.23456, and thus the tolerance of 1 ppm has been achieved without the need to add these last two resistors. Thus, the algorithm goes to step 204 and terminates.

It is believed that this algorithm will always converge on a desired final value, given any value of $R_{NOMINAL}$, since it will alternate between placing resistors in series and parallel, and each addition of one or more new resistors in parallel will contribute less to the overall value of Result than those added in the step before.

As compared to one method of the '097 patent in which all combinations of a number of elements are calculated and stored, the method described herein has the advantage that it need only calculate the compound element in question, rather than calculate and store all possible combinations of some number, for example 16, of individual elements. Thus, a single compound element, or a relatively small number of compound elements, may be determined in a much shorter period of time than calculating all of the possible combinations of a large number of nominal elements.

On the other hand, the design of the resulting compound element may be less optimal than that which would result from using the method of the '097 patent. It will be seen that in the example above, the resulting resistive element of FIG. 9 has 31 nominal resistors, rather than say 16 or even 24. This method of design is thus not expected to result in an element that is as compact as the method of the '097 patent.

One possible use of the method described herein is in designing a tapped delay line filter, a type of finite impulse response (FIR) filter which may be used, for example, to provide a desired frequency response to an input signal. The output of such a filter is a weighted combination of voltages taken from uniformly spaced taps, the weights provided by resistors connected to the delay line at various points. The accuracy of such filters depends heavily upon the ratio of the weights, i.e., the resistor values. Those of skill in the art will also see numerous other potential applications of the present invention.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, while resistors have been used for ease of illustration, as noted above inductors and capacitors follow identical or similar rules of calculating values for series and/or parallel connections, and those components may also be implemented using the techniques described herein, again as long as the formulas used to calculate the values of series and parallel connections are adjusted as noted above.

It should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method of designing a semiconductor circuit component having an arbitrary impedance value and constructed as a combination of repeated nominally identical impedance elements, wherein each impedance element is a resistor having a resistive impedance or each impedance element is an inductor having an inductive impedance, comprising:

receiving as an input at a computing device the arbitrary impedance value for the component and setting the arbitrary impedance value as a target value;

receiving as an input at the computing device a nominal impedance value of each of the repeated nominally identical elements to be used in the component;

defining in the computing device the initial value of the component as zero, and the combination of identical elements as a null set;

determining by the computing device whether the target value is greater or less than the nominal impedance value;

if the target value is greater than the nominal impedance value:

determining by the computing device the maximum number of impedance elements that when placed in series have a combined impedance less than the target value;

adding by the computing device the determined number of impedance elements, in series, to the combination of identical elements, connected to a most recently added identical element if any, and calculating an updated value of the component;

updating by the computing device the target value by subtracting the total impedance of the impedance elements added in series from the current target value;

if the target value is less than the nominal impedance value:

determining by the computing device the maximum number of impedance elements that when placed in parallel have a combined impedance greater than the target value;

adding by the computing device the determined number of impedance elements, in parallel, to the combination of identical elements, connected to a most recently added identical element if any, and calculating an updated value of the component;

updating by the computing device the target value by determining a impedance value that when placed in parallel with the impedance elements will result in the current target value;

determining by the computing device whether the updated value of the component is within a specified tolerance of the arbitrary impedance, and:

if the value of the component is not within the specified tolerance, repeating the step of determining whether the target value is greater or less than the nominal resistance value and subsequent steps;

if the value of the component is within the specified tolerance, exiting the process and returning the combination of identical elements as an output.

2. A non-transitory computer readable storage medium having embodied thereon instructions for causing a computing device to execute a method of designing a semiconductor circuit component having an arbitrary impedance value and constructed as a combination of repeated nominally identical impedance elements, wherein each impedance element is a resistor having a resistive impedance or each impedance element is an inductor having an inductive impedance, the method comprising:

receiving as an input at a computing device the arbitrary impedance value for the component and setting the arbitrary impedance value as a target value;

receiving as an input at the computing device a nominal impedance value of each of the repeated nominally identical elements to be used in the component;

defining in the computing device the initial value of the component as zero, and the combination of identical elements as a null set;
determining by the computing device whether the target value is greater or less than the nominal impedance value;
if the target value is greater than the nominal impedance value:
  determining by the computing device the maximum number of impedance elements that when placed in series have a combined impedance less than the target value;
  adding by the computing device the determined number of impedance elements, in series, to the combination of identical elements, connected to a most recently added identical element if any, and calculating an updated value of the component;
  updating by the computing device the target value by subtracting the total impedance of the impedance elements added in series from the current target value;
if the target value is less than the nominal impedance value:
  determining by the computing device the maximum number of impedance elements that when placed in parallel have a combined impedance greater than the target value;
  adding by the computing device the determined number of impedance elements in parallel, to the combination of identical elements, connected to a most recently added identical element if any, and calculating an updated value of the component;
  updating by the computing device the target value by determining a impedance value that when placed in parallel with the impedance elements will result in the current target value;
determining by the computing device whether the updated value of the component is within a specified tolerance of the arbitrary impedance, and:
  if the value of the component is not within the specified tolerance, repeating the step of determining whether the target value is greater or less than the nominal resistance value and subsequent steps;
if the value of the component is within the specified tolerance, exiting the process and returning the combination of identical elements as an output.

3. A method of designing a semiconductor circuit component having an arbitrary impedance value and constructed as a combination of repeated nominally identical impedance elements, wherein each impedance element is a capacitor having a capacitive impedance, comprising:
receiving as an input at a computing device the arbitrary impedance value for the component and setting the arbitrary impedance value as a target value;
receiving as an input at the computing device a nominal impedance value of each of the repeated nominally identical elements to be used in the component;
defining in the computing device the initial value of the component as zero, and the combination of identical elements as a null set;
determining by the computing device whether the target value is greater or less than the nominal impedance value;
if the target value is greater than the nominal impedance value:
  determining by the computing device the maximum number of impedance elements that when placed in parallel have a combined impedance less than the target value;
  adding by the computing device the determined number of impedance elements, in parallel, to the combination of identical elements, connected to a most recently added identical element if any, and calculating an updated value of the component;
  updating by the computing device the target value by subtracting the total impedance of the impedance elements added in parallel from the current target value;
if the target value is less than the nominal impedance value:
  determining by the computing device the maximum number of impedance elements that when placed in series have a combined impedance greater than the target value;
  adding by the computing device the determined number of impedance elements, in series, to the combination of identical elements, connected to a most recently added identical element if any, and calculating an updated value of the component;
  updating by the computing device the target value by determining a impedance value that when placed in series with the impedance elements will result in the current target value;
determining by the computing device whether the updated value of the component is within a specified tolerance of the arbitrary impedance, and:
  if the value of the component is not within the specified tolerance, repeating the step of determining whether the target value is greater or less than the nominal resistance value and subsequent steps;
  if the value of the component is within the specified tolerance, exiting the process and returning the combination of identical elements as an output.

* * * * *